(12) United States Patent
Hwang et al.

(10) Patent No.: US 11,968,224 B2
(45) Date of Patent: Apr. 23, 2024

(54) SHIFT-LEFT SECURITY RISK ANALYSIS

(71) Applicant: INTERNATIONAL BUSINESS MACHINES CORPORATION, Armonk, NY (US)

(72) Inventors: Jinho Hwang, Dobbs Ferry, NY (US); Larisa Shwartz, Greenwich, CT (US); Raghav Batta, Ossining, NY (US); Michael Elton Nidd, Zurich (CH); Jakub Krchak, Jindrichuv Hradec (CZ)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 17/249,997

(22) Filed: Mar. 22, 2021

(65) Prior Publication Data

US 2022/0303302 A1  Sep. 22, 2022

(51) Int. Cl.
| | | |
|---|---|---|
| *H04L 29/06* | (2006.01) | |
| *G06N 5/04* | (2023.01) | |
| *G06N 20/00* | (2019.01) | |
| *H04L 9/40* | (2022.01) | |

(52) U.S. Cl.
CPC .......... *H04L 63/1433* (2013.01); *G06N 5/04* (2013.01); *G06N 20/00* (2019.01)

(58) Field of Classification Search
CPC ....... H04L 63/1433; G06N 20/00; G06N 5/04
See application file for complete search history.

(56) References Cited

U.S. PATENT DOCUMENTS

| | | | |
|---|---|---|---|
| 9,128,728 B2 | 9/2015 | Siman | |
| 9,864,860 B2* | 1/2018 | Burrell | ................... G06F 21/54 |
| 10,608,911 B2 | 3/2020 | Nickolov | |
| 10,756,995 B2 | 8/2020 | Schibler | |
| 10,817,402 B2 | 10/2020 | Felipe | |

(Continued)

FOREIGN PATENT DOCUMENTS

| | | |
|---|---|---|
| CA | 2777434 C | 9/2019 |
| CN | 115186265 A | 10/2022 |
| JP | 2022146940 A | 10/2022 |

OTHER PUBLICATIONS

Almubayed, "Practical Approach to Automate the Discovery and Eradication of Open-Source Software Vulnerabilities at Scale", black hat USA, Aug. 3-8, 2019, Mandalay Bay, Las Vegas, 88 pages.

(Continued)

*Primary Examiner* — Evans Desrosiers
(74) *Attorney, Agent, or Firm* — Steven M. Bouknight (57) ABSTRACT

A method, a computer system, and a computer program product for security risk analysis is provided. Embodiments of the present invention may include collecting operational data. Embodiments of the present invention may include building pipelines. Embodiments of the present invention may include localizing security issues using the operational data on an unsupervised model. Embodiments of the present invention may include constructing a semantic graph using shift-left data. Embodiments of the present invention may include constructing a mapping between the operational data and the shift-left data. Embodiments of the present invention may include clustering collected datasets. Embodiments of the present invention may include creating an active learning cycle using ground truth.

20 Claims, 5 Drawing Sheets

(56) References Cited

U.S. PATENT DOCUMENTS

| | | | |
|---|---|---|---|
| 11,263,901 B1* | 3/2022 | Lerner | G08G 1/0145 |
| 2005/0283774 A1* | 12/2005 | Eichenberger | G06F 8/4452 717/151 |
| 2020/0210310 A1 | 7/2020 | Srinivasan | |

OTHER PUBLICATIONS https://github.com/features/security, "Securing software, together", Security, Accessed on Dec. 18, 2020, 15 pages.

https://nvd.nist.gov/vuln-metrics/cvss/v2-calculator, "Common Vulnerability Scoring System Calculator", CVSS Version 2, Vulnerability Metrics, NVD, Accessed on Dec. 18, 2020, 4 pages.

Mell et al., "The NIST Definition of Cloud Computing", Recommendations of the National Institute of Standards and Technology, Special Publication 800-145, Sep. 2011, 7 pages.

https://www.gartner.com/en/newsroom/press-releases/2019-10-23-gartner-says-global-it-spending-to-grow-3point7-percent-in-2020, Gartner Says Global IT Spending to Grow 3.7% in 2020, Newsroom, Press Releases, Orlando, Fla., Oct. 23, 2019, pp. 1-6.

https://www.opensecurityarchitecture.org/cms/definitions/security_patterns, "IT Security Patterns", Accessed on Dec. 18, 2020, 3 pages.

Joshi et. al, "Extracting Cybersecurity Related Linked Data from Text." 2013 IEEE Seventh International Conference on Semantic Computing, pp. 252-259.

Kaulgud et. al, "Shifting Testing Beyond the Deployment Boundary", 2016 International Workshop on Continuous Software Evolution and Delivery, CSED'16, May 14-15, 2016, Austin, TX, USA, pp. 30-33.

Neil et. al, "Mining Threat intelligence about Open-Source Projects and Libraries from Code Repository Issues and Bug Reports", © 2018 IEEE, pp. 7-12.

Wikipedia, "Security pattern", https://en.wikipedia.org/wiki/Security_pattern, Accessed on Dec. 18, 2020, 3 pages.

Yskout et al., "Do Security Patterns Really Help Designers?", ICSE '15: Proceedings of the 37th International Conference on Software Engineering—vol. 1, May 2015, 12 pages.

https://dblp.org/db/conf/icse/icse2015-1.html, "Security Pattern Catalog", 37th ICSE 2015: Florence, Italy, vol. 1, Part 1, 35 pages.

https://dblp.org/db/conf/icse/icse2015-1.html, "Security Pattern Catalog", 37th ICSE 2015: Florence, Italy, vol. 1, Part 2, 35 pages.

https://dblp.org/db/conf/icse/icse2015-1.html, "Security Pattern Catalog", 37th ICSE 2015: Florence, Italy, vol. 1, Part 3, 35 pages.

https://dblp.org/db/conf/icse/icse2015-1.html, "Security Pattern Catalog", 37th ICSE 2015: Florence, Italy, vol. 1, Part 4, 12 pages.

* cited by examiner

SHIFT-LEFT SECURITY RISK ANALYSIS

BACKGROUND

The present invention relates generally to the field of computing, and more particularly to machine learning and security. Information technology cyber attacks are growing and, as a result, security measures are constantly requiring new and improved methods to counterbalance the cyber attacks. Cloud computing environments, such as microservices, and users of microservices and computing applications can benefit from greater security measures.

Having the ability to detect security attacks and computing vulnerabilities early will reduce the risk in operational computing environments. Early security issue detection will also reduce the costs to mitigate the security issues.

Security detection methods consist of searching for vulnerabilities in libraries and base images, however, the computing application is not considered in the vulnerability or security analysis due to the complexity of the analysis. For example, microservices are vulnerable to security issues since software services run in a public environment or network.

A vulnerability in one microservice can be easily propagated from one software service to many other software services within the microservice architecture. Understanding a security risk before an application deployment will assist security professionals and site reliability engineers to prepare for potential security breaches.

Security violations may include the manipulation of programming code that creates a file during runtime. Additional security violations may include programming code that accesses multiple components in a cloud environment using hypertext transfer protocol (HTTP) or hypertext transfer protocol secure (HTTPS) without validation.

Programming code that uses old encryption methods is also a security violation or risk in a cloud computing environment. Additionally, both cloud computing environments and non-cloud computing environments are at risk of security violations in the programming code. For example, security violations can include external libraries that have security or vulnerability issues that have been reported, operating system calls that have security issues, or configuration level or environment level security issues. An additional example can include constructing Kubernetes or K8s since the construction usually contains multiple dependencies.

SUMMARY

Embodiments of the present invention disclose a method, a computer system, and a computer program product for security risk analysis. Embodiments of the present invention may include collecting operational data. Embodiments of the present invention may include building pipelines. Embodiments of the present invention may include localizing security issues using the operational data on an unsupervised model. Embodiments of the present invention may include constructing a semantic graph using shift-left data. Embodiments of the present invention may include constructing a mapping between the operational data and the shift-left data. Embodiments of the present invention may include clustering collected datasets. Embodiments of the present invention may include creating an active learning cycle using ground truth.

In another aspect of the exemplary embodiments, the method, the computer system and the computer program product include utilizing the unsupervised model to identify a top list of representative information for each software application.

In another aspect of the exemplary embodiments, the method, the computer system and the computer program product include constructing a semantic graph using shift-left data such as source code, deployment configurations and deployment specifications.

In another aspect of the exemplary embodiments, the method, the computer system and the computer program product include automatically clustering collected datasets by security issues.

In another aspect of the exemplary embodiments, the method, the computer system and the computer program product include creating an active learning cycle by collecting feedback from subject matter experts to improve the precision of security risk identification by a model over time.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, information technology cyber attacks are growing and, as a result, security measures are constantly requiring new and improved methods to counterbalance the cyber attacks. Cloud computing environments, such as microservices, and users of microservices and computing applications can benefit from greater security measures. The ability to detect security attacks or computing vulnerabilities early will significantly lower the risk in the operational computing environments and will reduce the cost to mitigate the security issues.

Many security detection methods consist of searching for vulnerabilities in libraries and base images, however, the computing application is not considered in the vulnerability or security analysis due to the complexity of the analysis. Microservices or service mesh deployment in a cloud native environment are vulnerable to security issues since software services run in a public environment or network. This causes one security issue to be easily propagated from one software service to many other services.

Gaining an understanding of a security risk before an image build or application deployment will assist security professionals and site reliability engineers to prepare for a potential breach. Therefore, it may be advantageous to, among other things, enable the learning, mapping and analysis of patterns of source codes and the types of security issues that can occur in the code by feeding the back operational experience data and history data into a shift-left learning model or environment.

The following described exemplary embodiments provide a system, a method and a program product for machine learning and security risk analysis. As such, embodiments of the present invention have the capacity to improve the field of security by creating machine learning models to learn security patterns from operational data. More specifically, operational data is used to construct a language-agnostic knowledge graph to build foundational information regarding security issues in a language agnostic format. Shift-left analysis is used to connect to the operational information to formulate a security risk analysis and to predict, recommend and explain the most probable causes of the identified issue.

According to an embodiment, shift-left security risk analysis is created using machine learning. Shift-left analysis may be created by using historical data and real-time data collected through or during shift-left activities. Shift-left data may include, for example, source code, deployment configurations, deployment specifications or environmental variables which all may be used to augment more in-depth data. Shift-left may include a practice or a method that is intended to identify and prevent defects early in a software delivery process. Shift-left aims to improve the quality of the software delivery process by moving tasks to the left as early in the lifecycle as possible. Thus, shift-left data may include data such as testing data, configuration data, requirements, programming code, or any data used in the software delivery lifecycle.

One use case presented herein is to create a predictive and a proactive information technology management structure and system. For example, the shift-left security risk analysis can continuously run security risk analyses and inform information technology engineers for a proactive avoidance of security risks. Additionally, a predictive model security risk output can expand the explanation of the security issues to help software and security developers locate and tackle the security issues by providing code level or configuration level explanations.

According to an embodiment, machine learning is used to train and test models using datasets, such as operational data in a computing environment. Various types of machine learning models may be built and used to create predictive results for providing security risk analyses and outputs that can explain at a code level or configuration level to help identify security issues. Data or information from domains other than the information technology industry may be used to provide predictive results for security risks. Other domains may include, for example, research, compliance, safety data, pharmaceutical, manufacturing, quality testing, retail, entertainment, social media, business, technology, medical, academic, government, industrial, food chain, legal or automotive.

Machine learning models may include, for example, artificial intelligence models, deep learning models, active learning models, neural networks, convolution neural networks (CNNs), artificial neural networks (ANNs) and regression models. Deep learning may also be related to or known as hierarchical learning or deep structured learning. The term model may be used to indicate various types of machine learning models, such as a deep learning model, a neural network model, a trained model, an attention-based model, a classification model, a regression model or a decision tree model.

Training, testing and updating a machine learning model may include using supervised, unsupervised and semi-supervised machine learning procedures. Supervised learning may use a labeled dataset or a labeled training set to build, train and update a model. Unsupervised learning may use all unlabeled data to train a model. Semi-supervised learning may use both labeled datasets and unlabeled datasets to train a model. Supervised learning and semi-supervised learning may incorporate feedback or ground truth by having an individual check the accuracy of the data, data labels, annotations and data classifications. Individuals may typically include a subject matter expert who has extensive knowledge in the particular domain of the dataset.

Cognitive analyses, such as natural language processing (NLP) and semantic analysis, may be used during the building and training of a model. The cognitive analytics may analyze both structured and unstructured data to be incorporated into the machine learning (ML) process. Natural language processing (NLP) may be used to analyze the quality of data or feedback that is received for training and model building. Structured data may include data that is highly organized, such as a spreadsheet, a relational database or data that is stored in a fixed field. Unstructured data may include data that is not organized and has an unconventional internal structure, such as a portable document format (PDF), an image, a presentation, a webpage, video content, audio content, an email, a word processing document or multimedia content.

The received data may be processed using natural language processing (NLP) to extract meaningful information for training and building a model. Semantic analysis may be used to infer the complexity, meaning and intent of the information or data received. Semantic analysis may also consider syntactic structures of information at various levels to infer meaning to words, phrases, sentences and paragraphs of the received, collected or extracted data. The cognitive analyses may, for example, be used to produce outputs and predictions related to security risks and predicted security issues in computing environments.

Input data or datasets used for training, testing and updating models may include, for example, operational data obtained from shift-left activities. For example, operational data may include data obtained from operational records (e.g., incident reports or changes in reports) or operational logs used to track system and network errors. Operational records may also track analytics for the system and network infrastructure, application management in a cloud computing network, business operations, software analytics or data related to system security in a cloud or hybrid cloud network environment. Operational records may include operational logs or alerts, system logs, network logs, incident tickets, metrics, analysis tools or a system that tracks network or application activity. The activity may include regular operation logs and the activity may include errors in the system. Operational records may include computing data pertaining to, for example, events, alerts, metrics, logs or messages.

Input data may also include computer programming code and sections of the programming code, such as code snippets. Code snippets may be broken down into segments and different aggregation techniques may be used to improve classification. For example, a code snippet that creates a file during runtime can be manipulated over time with certain permissions and this is a security violation in a cloud environment. Another security violation includes a code snippet that accesses other components using hypertext transfer protocol (HTTP) or hypertext transfer protocol secure (HTTPS) without validation in a cloud environment. A code snippet that uses old encryption methods is also a security violation in a cloud environment. Programming code that uses old encryption methods is also a security violation or risk in a cloud computing environment.

In addition, both cloud computing environments and non-cloud computing environments are at risk of security violations in the programming code. For example, security violations can include external libraries that have security or vulnerability issues that have been reported, operating system calls that have security issues, or configuration level or environment level security issues. An additional example can include constructing Kubernetes or K8s since the construction usually contains multiple dependencies.

Figure 1:
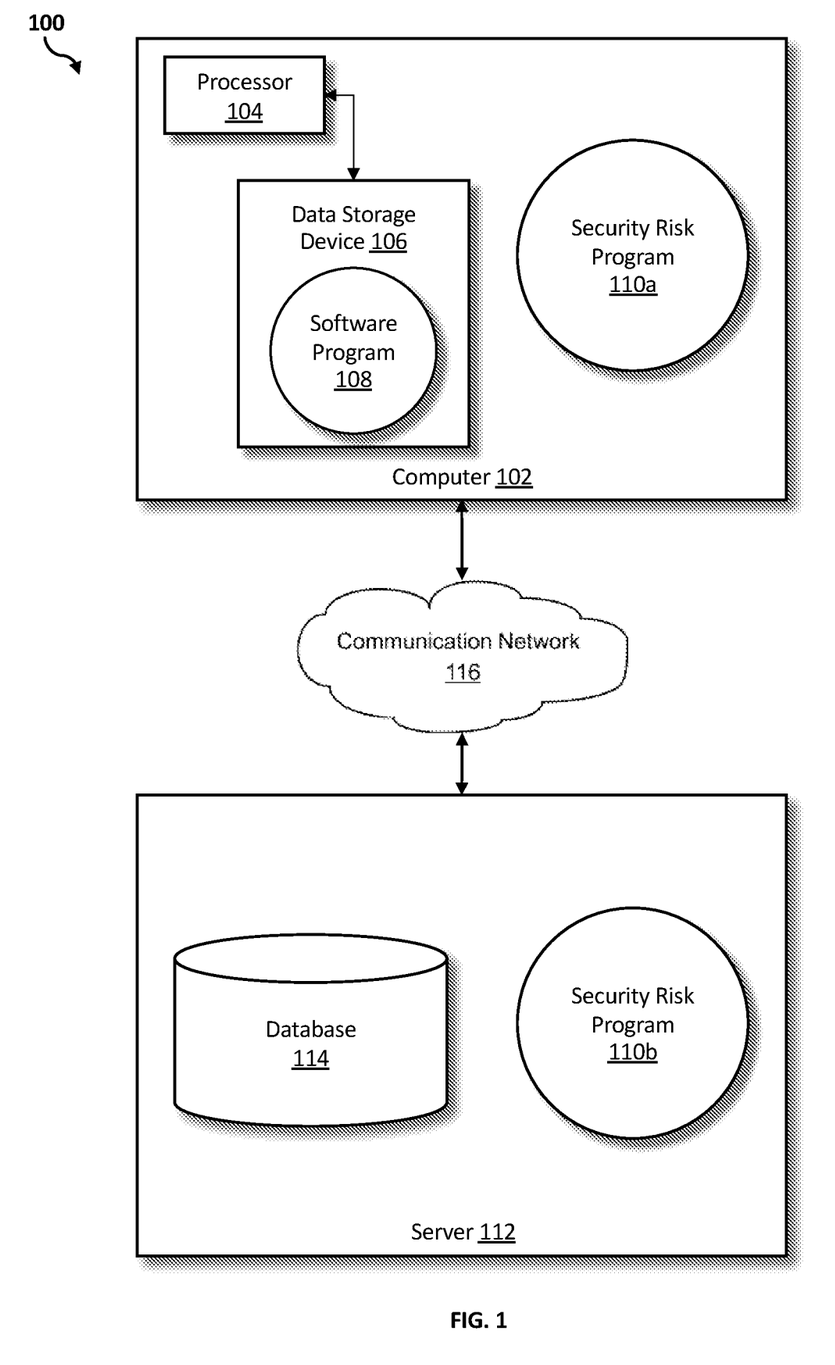
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a security risk program 110a. The networked computer environment 100 may also include a server 112 that is enabled to run a security risk program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 3, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the security risk program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the security risk program 110a, 110b (respectively) to predict and identify security risks in a computing environment. The security risk method is explained in more detail below with respect to FIG. 2.

Figure 2:
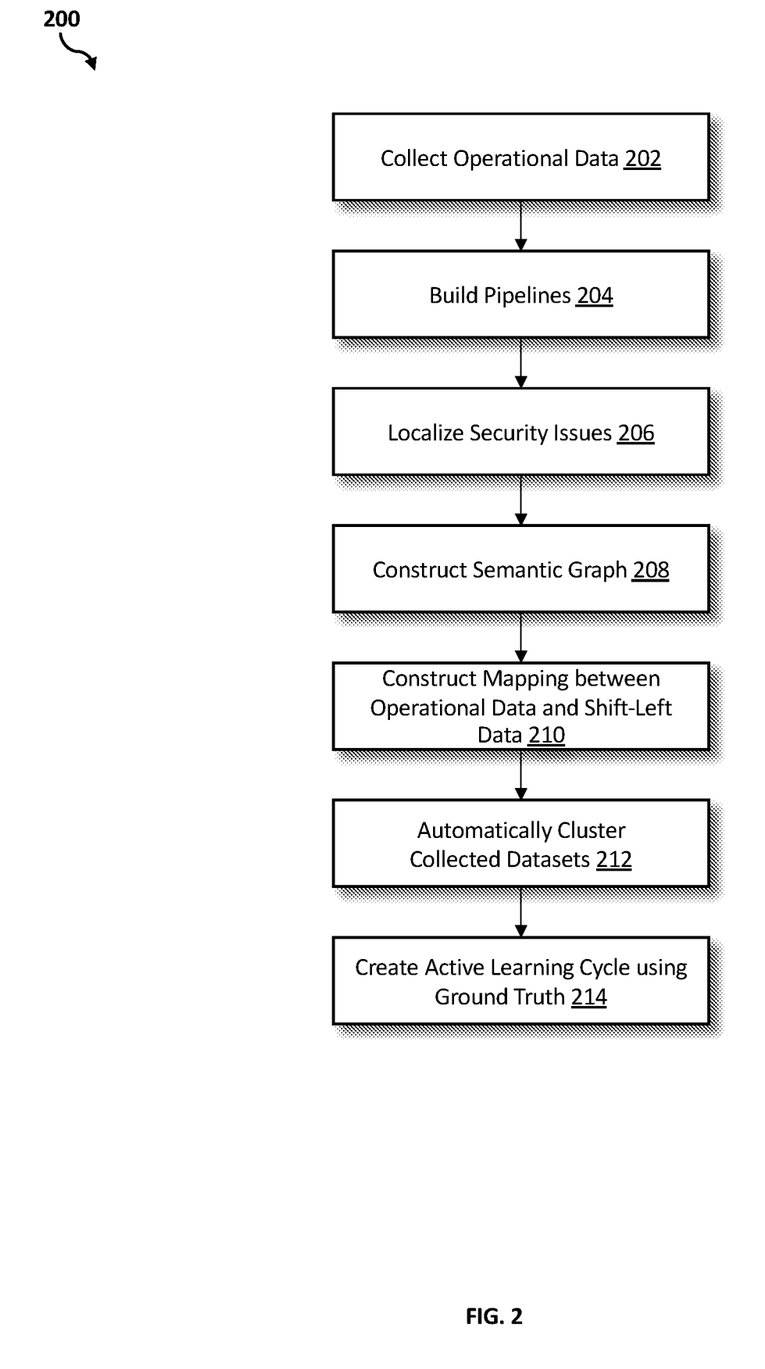
FIG. 2 is an operational flowchart illustrating a process for shift-left security risk analysis according to at least one embodiment.

Referring now to FIG. 2, an operational flowchart illustrating the exemplary shift-left security risk analysis process 200 used by the security risk program 110a, 110b according to at least one embodiment is depicted.

At 202, operational data is collected. Operational data is collected to train a machine learning model. The operational data may be used as training datasets and testing datasets to train the model. Operational datasets may include, for example, incident tickets, logs, metrics, results of analysis tools, such as vulnerability advisors or mutation advisors. The operational datasets may be used to build pipelines, such as testing results and static analyses. Operational data may be collected from one or more sources, databases, repositories or knowledgebases, such as log management system repositories, a configuration management database or system or an observability store.

At 204, pipelines are built. Pipelines may be built as a set of automated processes. For example, a DevOps pipeline builds, tests and deploys computing data. Pipelines may include, for example, a computer ticket processing system. The pipelines may be built, for example, as one pipeline of data that may process development data from the ticketing system and another pipeline of data that may process operational data or production data. The ticket system may have a security protocol and may be used by DevOps pipelines that have continuous deliveries of computing data that are collected. A DevOps pipeline may include a system that combines, for example, internet technology operations with software development.

The development section of the pipeline may include planning, adapting, preproducing, verifying, creating and releasing of new functionalities. The operational pipeline may include prevention, detection, responding and predicting of client impacting events. The DevOps pipelines may be operated in a cloud computing environment and the pipelines may be used to create application logs, system logs, metrics and analysis tool logs.

At 206, security issues are localized. The security issues may be localized based on the operational data collected at step 202 and the pipeline data created at step 204. Locational information may be extracted from the obtained data by building an unsupervised model to identify a top list of representative information for each software application or application. For example, the top list of representative information includes component names and services names. The top list of representative information or data is identified using, for example, incident tickets, logs, metrics and results of analysis tools with the unsupervised model.

The unsupervised machine learning algorithm may be used to identify pertinent information, such as authorizations or names of services using topic modeling, clustering or Apriori or ontologies. As an example, see the following representation, $$P(\text{word}=\text{Auth, topic}=1|\theta_d, \beta_1)=$$

$$P(\text{word}=\text{Auth}|\text{topic}=1, \beta_1)P(\text{topic}=1|\theta_d)$$

where each topic has a distribution over words (word=Auth I topic=1, $\beta_1$) that is global across all documents and each topic has a distribution over words (topic=1|$\theta_d$) that is local across all documents. For example, $\beta_1$ represents the probability of a token that is the joint probability of the word and the topic label. P represents a probability, $\theta_d$ represents the topic proportions for document d and $\beta_k$ represents the distribution over a vocabulary for topic k.

The security problem may be localized, and the shift-left section of the security problem may be identified. Localization or the identified security problem may include a location that is responsible for creating the problem or issue. For example, a problem is localized by knowing what code or library is running when an error occurs so the connections to the information are from shift-left of the code or function. For each security issue, the issue or the problem may be localized using application and system logs. A security issue may be found using the built unsupervised model above.

Location information and representative keywords or words may be extracted. The location information and representative keywords may be extracted by using the built unsupervised model. The information or the unsupervised model output may be correlated to match the same location information from different sources. The information or unsupervised model output may also be correlated to excluded references that have not been identified in the locations.

At 208, a semantic graph is constructed. A semantic graph may be built, constructed or created using shift-left data, such as source code, configuration information and build information. A build may refer to a process that converts files into a software product. For example, files such as code and libraries are converted to a software product and the build includes information about file versions. Based on the localized security issue, the security issue may be correlated by attributing the localized issue as a graph representation. A semantic graph may include a graph that shows or represents programming language. The source code, configuration information and the build information may be obtained and updated over time. The source code may be collected, for example, from git repositories. The semantic graph may be updated to show changes over time using shift-left data. For example, changes in source code may be represented as a graph showing the changes over time of the shift-left data.

At 210, a map between operational data and shift-left data is constructed. Operational data and shift-left data are used to construct a map to identify which part or section of the code or configuration contains the source of the security issue. A map may be constructed, for example, using a location from operational data plus a time when a new build was deployed, which would point to source code files (e.g., versions or dates) that were changed in the build.

At 212, collected datasets are automatically clustered. The collected datasets are automatically clustered by security issues. Clustering the collected datasets allow for the learning of patterns of security issues. The patterns of security issues may be provided into a standard vulnerability calculation, such as a common vulnerability scoring system, to calculate risk.

The clustered datasets and semantic graphs may be used to learn security classes or classifications of the code. For example, using graph embedding vectors and security classification information, a model is built with a graph using a neural network. Graph embeddings may be used for the transformation of property graphs to a vector or a set of vectors. One graph neural network may be applied, such as a gated graph neural network, a graph long short-term memory (LSTM) neural network or a graph convolution network. The training data or the training datasets may include, for example, graph embeddings or classes. For example, a graph may be embedded, then the graph embedding is fed into the graph neural network. The graph neural network will provide classifications, such as attack vector, access complexity, authentication, confidentiality impact, integrity impact and availability impact. A model is then build, beginning with a graph and ending with classifications.

The security patterns may be classified. Security patterns may be collected from many software engineers who share the patterns on public and private databases. Security patterns, for example, may be design patterns or may be descriptions of how to design or implement a system with a specific type of security. Classifying security patterns into known classes or types of attacks may assist in calculating a risk level of a security issue. For example, attack vectors, access complexity, authentication, confidentiality impact, integrity impact and availability impact are classifications. A map of the security patterns to security type may be identified using, for example, an existing common vulnerabilities and exposure (CVE) database that show patterns to a common vulnerability scoring system (CVSS) score. The patterns to a common vulnerabilities and exposure (CVE) database may be used to calculate a pattern vulnerability score using a common vulnerability scoring system (CVSS).

The security patterns may be based on and may be classified by learning from past security incidents. For example, from source or configuration comments, from cloud histories, such as incident tickets, logs and metrics. The security risk program 110a, 110b, may, for example, capture the semantics of the code and the configuration data with allows the security issues to be automatically captured in a language agnostic manner. The benefit of capturing security issues in a language agnostic manner may include allowing user created artifacts, such as tickets created in different programming languages, to be able to translate or transform similar information from a variety of languages into the ability to identify repeating security issues or patterns.

The security patterns may be fed into a classifier and the model output may include, for example, classes and types. The security risk level or a security risk calculation may include, for example, using the classification model output and the common vulnerability scoring system (CVSS) to calculate the vulnerability score. A temporal and an environmental score metrics may be added to reflect situational impacts. Situational impacts may include, for example, impacts on operating systems or specific network providers. Vulnerability scoring and metrics examples for a temporal and environmental score metrics may also be calculated using a common vulnerability scoring system calculator.

At 214, an active learning cycle using ground truth is created. The active learning cycle may include an active learning feedback model or component that incorporates ground truth by, for example, allowing software developers or subject matter experts the ability to provide feedback that can be consumed by the learning model. The active learning component may enable capturing expert knowledge which may include capturing real-time data. Continuous validations, adjustments and correcting model inaccuracies over time using subject matter experts to update classifications may be used as an active learning component. The active learning cycle may be retrained at any point, for example, periodically, in an online or in an offline mode.

The active learning component may, for example, take a hyperplane chart (i.e., separates data points on one side of a plane or another) that represents labeled data only and modify the labels using an expert to provide a transductive learning (i.e., insert reasoning from specific cases or information). The active learning component may leverage supervised and semi-supervised models to inject real-time information or expert feedback to be added as ground truth. Active learning may be used by obtaining, for example, subject matter expert (SME) or software developer feedback as ground truth during the model training, testing and validation phases. User knowledge or expert knowledge may be captured as real-time data.

The active learning cycle is beneficial since data sources may not always perfectly represent the security issues. Allowing user feedback to adjust or correct information allows for improved precision in security risk identification by the model over time. Subject matter experts may provide information that allows the learning model to be adjusted over time to correct any inaccuracies in the model or in the data sources.

As an example, an active learning system or model may be used to automatically map the operational data and shift-left data to identify which part of the code or configuration is the source of the security issue. The learning model may be used to construct a graph using data from a repository. The data from the repository is used with the learning model to create a graphical representation of the data. For example, the learning model may be used to obtain meta information from a subtree or a subgraph. For each repository or database, information is collected, such as source code, configuration information (e.g., libraries) and build specifications. The learning model may be used to provide a subgraph for a node. The subgraph may have data or meta data represented as labels. A graph convolution operation may be used to take the average value of a node's features along with the features of the node's neighbors. Node neighbors, as distinct from image or text data, may be unordered and variable in size. For example, the subgraph node A and node X are processed through one or more a graph convolution networks (GCNs) followed by a pooling function before being processed by a multilayer perceptron (MLP) network. The output may provide a softmax layer that represents meta information of the one or more nodes features.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
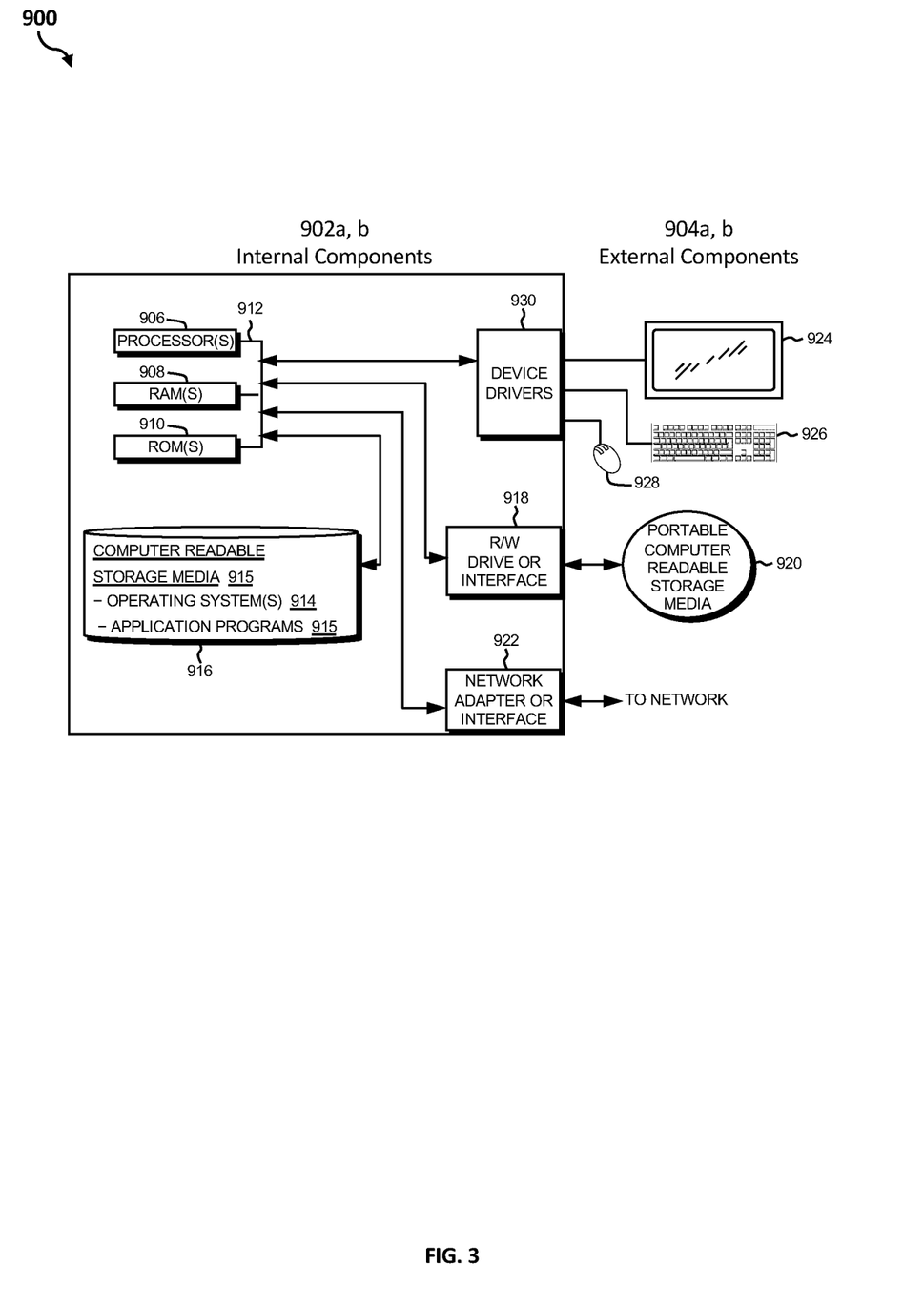
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the security risk program 110a in client computer 102, and the security risk program 110b in network server 112, may be stored on one or more computer readable storage media 915 for execution by one or more processors 906 via one or more RAMs 908 (which typically include cache memory). In the embodiment illustrated in FIG. 3, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the security risk program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G/4G/5G wireless interface cards or other wired or wireless communication links. The software program 108 and the security risk program 110a in the computer 102 and the security risk program 110b in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the security risk program 110a in computer 102 and the security risk program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
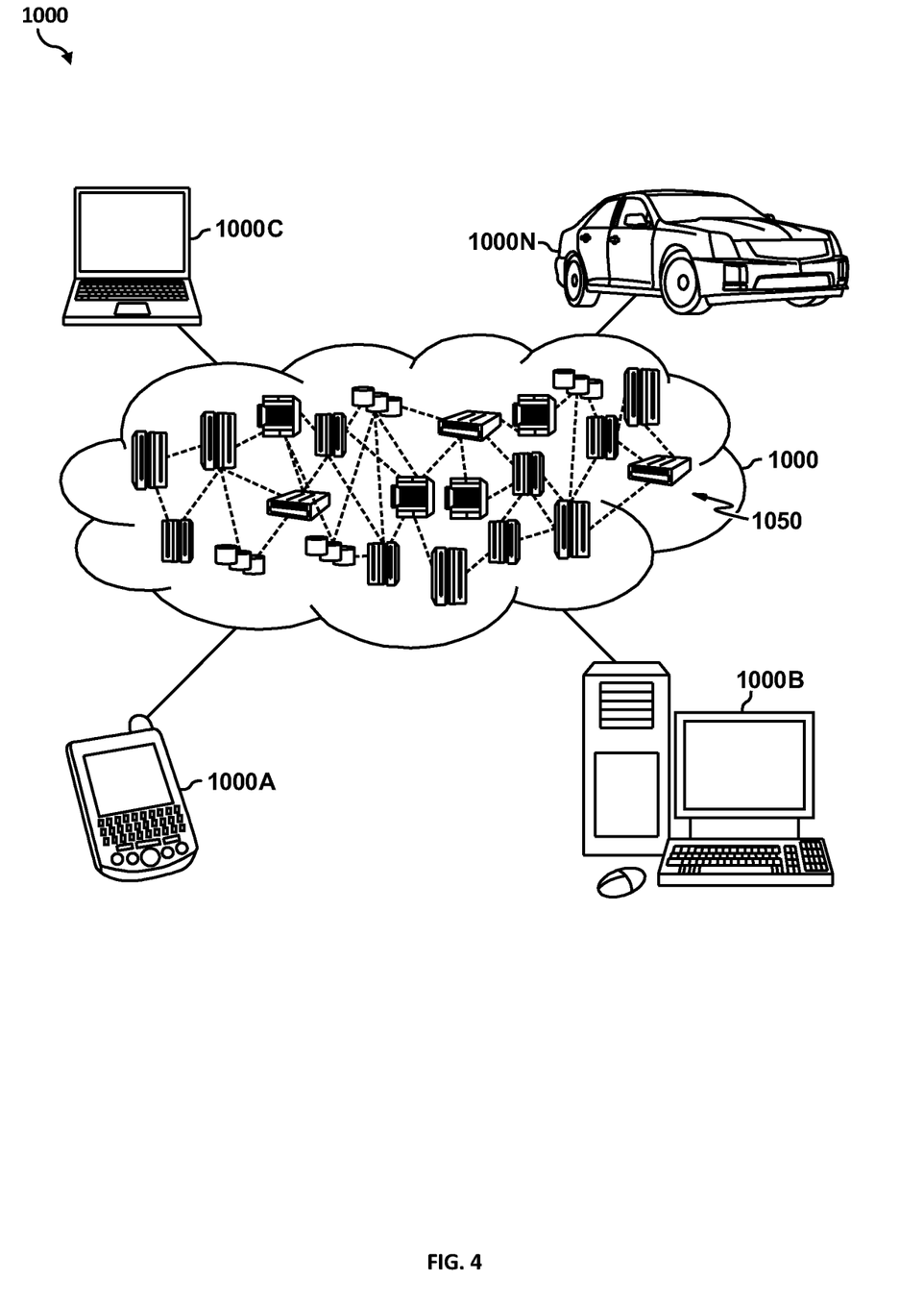
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 1050 and cloud computing environment 1000 can communicate with any type of computerized device over any type of network and/or network addressable connection (e.g., using a web browser).

Figure 5:
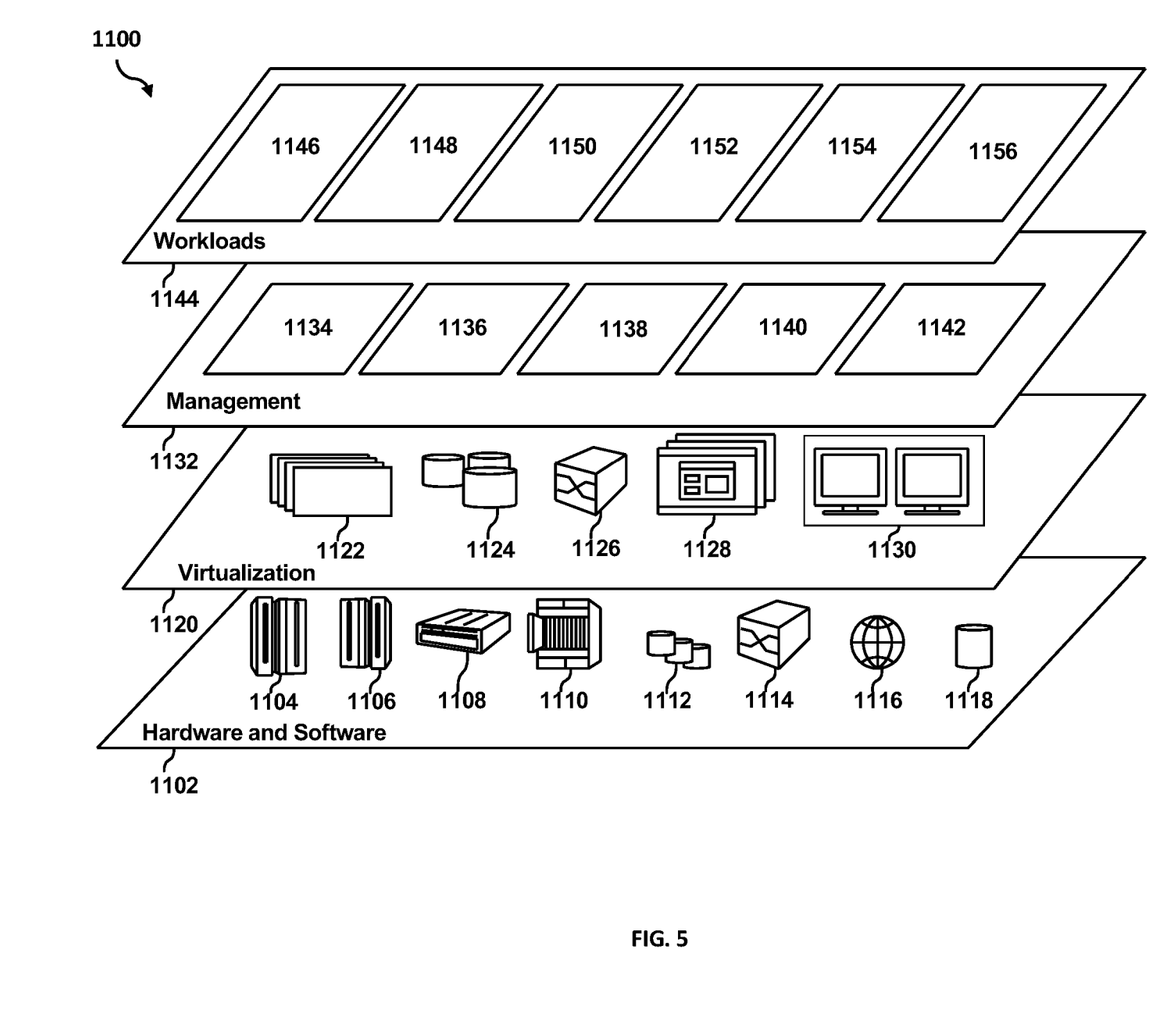
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and security risk analysis 1156. A security risk program 110a, 110b provides a way to provide security risk analyses using machine learning.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for security risk analysis, the method comprising:
   collecting operational data from different sources;
   building pipelines based on the collected operational data;
   localizing security issues by applying an unsupervised model to the operational data and extracting representative information from the operational data;
   identifying shift-left data based on the localized security issues;
   constructing a semantic graph using the shift-left data;
   constructing a mapping between the operational data and the shift-left data;
   clustering collected datasets; and
   based on determined patterns of security issues, creating an active learning cycle using ground truth, wherein the active learning cycle automatically maps the operational data and the shift-left data to identify a source of a security issue.

2. The method of claim 1, wherein the pipelines are built as an automated process that builds, tests and deploys computing data.

3. The method of claim 1, wherein the unsupervised model identifies a top list of representative information for each software application.

4. The method of claim 1, wherein the shift-left data includes source code, deployment configurations, deployment specifications and environmental variables.

5. The method of claim 1, wherein the semantic graphs are constructed using the shift-left data.

6. The method of claim 1, wherein the collected datasets are clustered, automatically, by the security issues.

7. The method of claim 1, wherein the active learning cycle allows feedback from subject matter experts to improve precision of security risk identification by a model over time.

8. A computer system for security risk analysis, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   collecting operational data from different sources;
   building pipelines based on the collected operational data;
   localizing security issues by applying an unsupervised model to the operational data and extracting representative information from the operational data;
   identifying shift-left data based on the localized security issues;
   constructing a semantic graph using the shift-left data;
   constructing a mapping between the operational data and the shift-left data;
   clustering collected datasets; and
   based on determined patterns of security issues, creating an active learning cycle using ground truth, wherein the active learning cycle automatically maps the operational data and the shift-left data to identify a source of a security issue.

9. The computer system of claim 8, wherein the pipelines are built as an automated process that builds, tests and deploys computing data.

10. The computer system of claim 8, wherein the unsupervised model identifies a top list of representative information for each software application.

11. The computer system of claim 8, wherein the shift-left data includes source code, deployment configurations, deployment specifications and environmental variables.

12. The computer system of claim 8, wherein the semantic graphs are constructed using the shift-left data.

13. The computer system of claim 8, wherein the collected datasets are clustered, automatically, by the security issues.

14. The computer system of claim 8, wherein the active learning cycle allows feedback from subject matter experts to improve precision of security risk identification by a model over time.

15. A computer program product for security risk analysis, comprising:
   one or more computer-readable tangible storage media and program instructions stored on at least one of the one or more computer-readable tangible storage media, the program instructions executable by a processor to cause the processor to perform a method comprising:
   collecting operational data from different sources;
   building pipelines based on the collected operational data;
   localizing security issues by applying an unsupervised model to the operational data and extracting representative information from the operational data;
   identifying shift-left data based on the localized security issues;
   constructing a semantic graph using the shift-left data;
   constructing a mapping between the operational data and the shift-left data;
   clustering collected datasets; and
   based on determined patterns of security issues, creating an active learning cycle using ground truth, wherein the active learning cycle automatically maps the operational data and the shift-left data to identify a source of a security issue.

16. The computer program product of claim 15, wherein the pipelines are built as an automated process that builds, tests and deploys computing data.

17. The computer program product of claim 15, wherein the unsupervised model identifies a top list of representative information for each software application.

18. The computer program product of claim 15, wherein the shift-left data includes source code, deployment configurations, deployment specifications and environmental variables.

19. The computer program product of claim 15, wherein the semantic graphs are constructed using the shift-left data.

20. The computer program product of claim 15, wherein the collected datasets are clustered, automatically, by the security issues.

\* \* \* \* \*